United States Patent [19]

Konno et al.

[11] Patent Number: 4,531,815

[45] Date of Patent: Jul. 30, 1985

[54] OBJECTIVE LENS

[75] Inventors: Kunio Konno, Yokohama; Masashi Tanaka, Kawasaki; Hiroshi Ohki, Tokyo, all of Japan

[73] Assignee: Nippon Kogaku K. K., Tokyo, Japan

[21] Appl. No.: 500,808

[22] Filed: Jun. 3, 1983

[30] Foreign Application Priority Data

Jun. 9, 1982 [JP] Japan .................................. 57-98685

[51] Int. Cl.³ .......................... G02B 9/14; G02B 21/02
[52] U.S. Cl. ..................................... 350/475; 350/414
[58] Field of Search ................................. 350/475, 414

[56] References Cited

U.S. PATENT DOCUMENTS 4,258,981 3/1981 Goto ..................................... 350/475
4,416,519 11/1983 Kobayashi ........................... 350/475

FOREIGN PATENT DOCUMENTS 2703823 8/1977 Fed. Rep. of Germany ...... 350/475

Primary Examiner—John K. Corbin
Assistant Examiner—Rebecca D. Gass
Attorney, Agent, or Firm—Shapiro and Shapiro

[57] ABSTRACT

An objective lens has a positive first lens disposed at a position most distant from an object surface, a meniscus-shaped second lens disposed on the object side of the first lens and having its convex surface facing the object side, and a positive third lens disposed on the object side of the second lens. The objective lens satisfies the following conditions:

$$0.9 < |r_4|/f < 25$$

$$-0.45 < f/f_2 < 0.02$$

$$d_4/f < 0.18$$

where f is the total focal length of the entire system, $r_4$ is the radius of curvature of the surface of the second lens which is adjacent to the object side, $f_2$ is the focal length of the second lens, and $d_4$ is the spacing between the second lens and the third lens.

13 Claims, 13 Drawing Figures

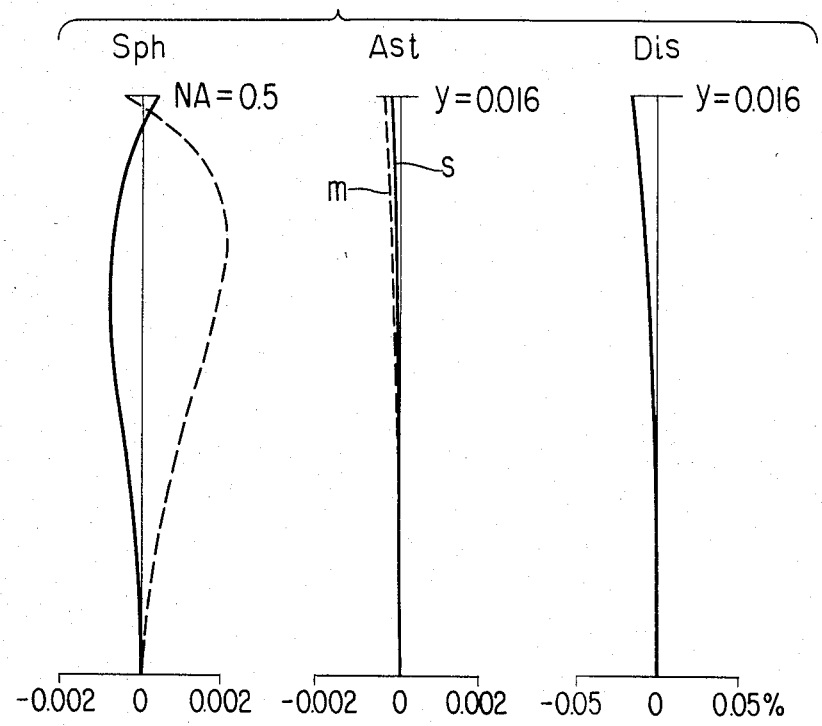
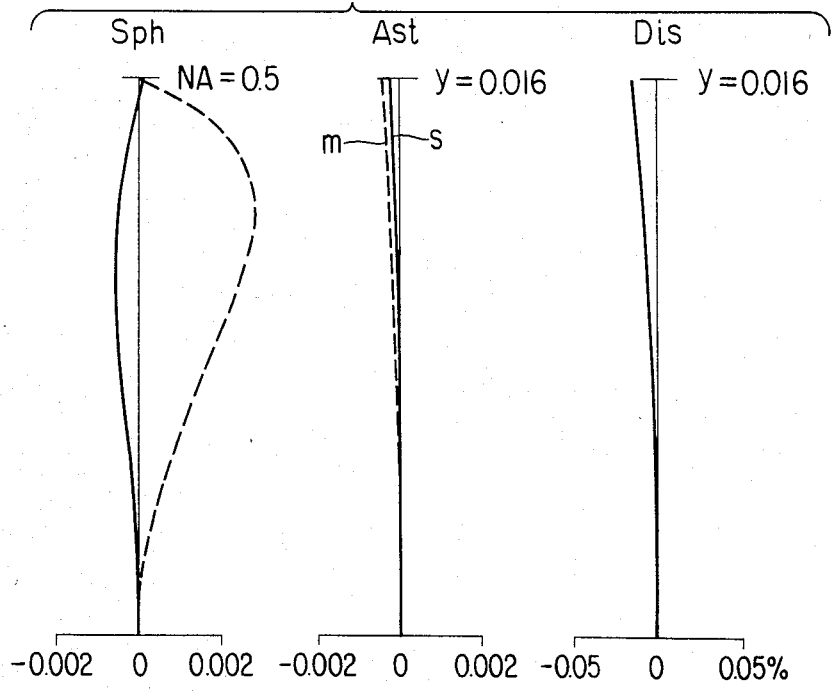

OBJECTIVE LENS

BACKGROUND OF THE INVENTION

1. Field of the Invention

This invention relates to a so-called pick-up objective lens for reading information on an object surface.

2. Description of the Prior Art

Various pick-up objective lenses for deriving signals from a video disc on which information is highly densely recorded are known, but it has been difficult to maintain an excellent imaging performance by a lens construction comprising a small number of lenses because the weight of the objective lens must be very light, say, less than several grams. Particularly, to avoid contact between an object surface and the objective lens, the objective lens has required a long working distance and it has been very difficult to provide an excellent imaging performance and a high resolving power and yet provide a long working distance and thus, it has still been impossible to provide an objective lens having a sufficiently long working distance.

SUMMARY OF THE INVENTION

It is an object of the present invention to provide a compact objective lens having a long working distance and yet having an excellent imaging performance and a high resolving power.

The invention will become fully apparent from the following detailed description thereof taken in conjunction with the accompanying drawings.

BRIEF DESCRIPTION OF THE DRAWINGS

FIGS. 4 to 13 show various aberrations in the first to tenth embodiments, respectively, of the present invention.

DESCRIPTION OF THE PREFERRED EMBODIMENTS

Figure 1:
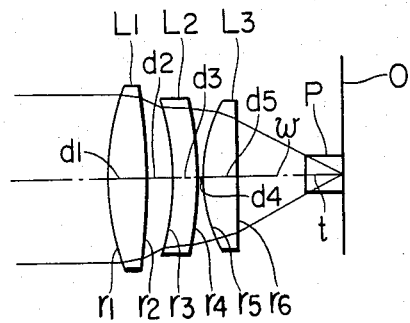
FIG. 1 shows a lens construction according to a first embodiment of the present invention.

An objective lens in accordance with the present invention has a positive first lens $L_1$ disposed at a position most distant from an object surface O, a meniscus-shaped second lens $L_2$ disposed on the object side of the first lens and having its convex surface facing the object side, and a positive third lens $L_3$ disposed on the object side of the second lens, and bending of the second lens $L_2$ toward the object side is made relatively sharp and the spacing between the second lens $L_2$ and the third lens $L_3$ is made small, thereby securing a long working distance. The objective lens satisfies the following conditions to enhance its imaging performance while having a great numerical aperture:

$$0.9 < |r_4|/f < 25 \tag{1}$$

$$-0.45 < f/f_2 < 0.02 \tag{2}$$

$$d_4/f < 0.18 \tag{3}$$

where f is the total focal length of the entire system, $r_4$ is the radius of curvature of the surface of the second lens $L_2$ which is adjacent to the object side, $f_2$ is the focal length of the second lens $L_2$, and $d_4$ is the spacing between the second lens $L_2$ and the third lens $L_3$.

Condition (1), with condition (2), substantially prescribes the degree of bending of the seconds lens. If the upper limit of condition (1) is exceeded, the bending of the second lens will become weak and therefore, the principal point of the second lens will become more distant from the object side and thus, the working distance will be reduced and correction of astigmatism will become difficult. On the other hand, if the lower limit of condition (1) is exceeded, the bending of the second lens will become too sharp and therefore, the offense against the sine condition will increase to make it difficult to maintain a sufficient imaging performance. As prescribed by condition (2), the refractive power of the second lens is possible in the range from the negative to the relatively weak positive, but if the upper limit of this condition is exceeded, the positive spherical aberration created in this lens will be too small and therefore, the correction of the entire system will be deficient and, if the lower limit of this condition is exceeded, it will be advantageous for the correction of spherical aberration, but it will become difficult to sufficiently secure the working distance.

Condition (3) is for disposing the third lens as proximately as possible to the second lens. If the spacing between these two lenses substantially exceeds this condition, the working distance will become short even if the second lens has an optimum refractive power and shape for securing a long working distance on the basis of conditions (1) and (2), and at the same time, the full length of the lens will become great and necessarily the lens barrel will become long and thus, an increased weight of the lens will be unavoidable.

In the basic construction of the objective lens according to the present invention, it is desirable that the following conditions be further satisfied:

$$1.0 < f_3/f < 2.1 \tag{4}$$

$$0.5 < r_5/f < 1.0 \tag{5}$$

where $f_3$ is the focal length of the third lens and $r_5$ is the radius of curvature of the surface of the third lens which is adjacent to the second lens. That is, condition (4) prescribes the focal length of the third lens and, if the lower limit of this condition is exceeded, the positive refractive power of the third lens will be too strong and therefore, spherical aberration will be undercorrected and, if the positive refractive power of the third lens becomes weak beyond the upper limit of this condition, the diverging action in the second lens will become weak and this is disadvantageous for good correction of spherical aberration. If the upper limit of condition (5) is exceeded, correction of high order spherical aberration will become difficult and, if the lower limit of the condition (5) is exceeded, spherical aberration is liable to be under-corrected and astigmatism will become substantial, and this is disadvantageous for the enlargement of the working distance.

In addition to these condition, it is also effective to satisfy the following condition regarding the on-axis spacing $d_2$ between the first lens and the second lens and the center thickness $d_3$ of the second lens:

$$0.4 < d_2/d_3 < 2.0$$

By the above-described construction, there is achieved an objective lens having a compact shape in which the full length $\Sigma d = d_1 + d_2 + d_3 + d_4 + d_5$ from the first lens to the third lens is in the range of $$0.50f < \Sigma d < 1.0f$$

and yet having an excellent imaging performance while securing a working distance w 0.45 times as great as the focal length f of the entire system. If $\Sigma d$ exceeds said upper limit, the working distance will become shorter in proportion to the amount of excess and, to correct this, the bending of the second lens $L_2$ must be made extremely sharp. If the bending of the second lens $L_2$ becomes sharp, conditions (1) and (2) will not be satisfied and particularly, correction of spherical aberration will become difficult and the radius of curvature will become smaller, making the manufacture of the lens difficult. If $\Sigma d$ exceeds said lower limit, corrrection of astigmatism will become difficult.

Figure 2:
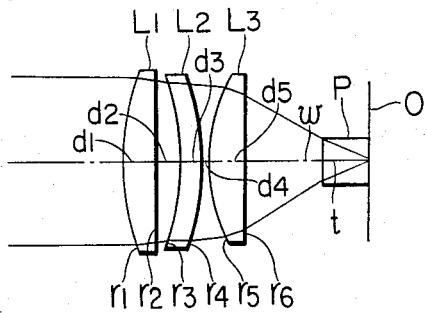
FIG. 2 shows a lens construction according to a fourth embodiment of the present invention.
Figure 3:
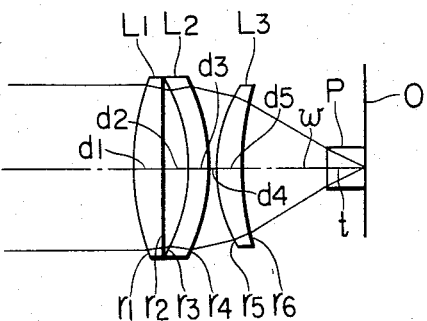
FIG. 3 shows a lens construction according to a seventh embodiment of the present invention.
Figure 6:
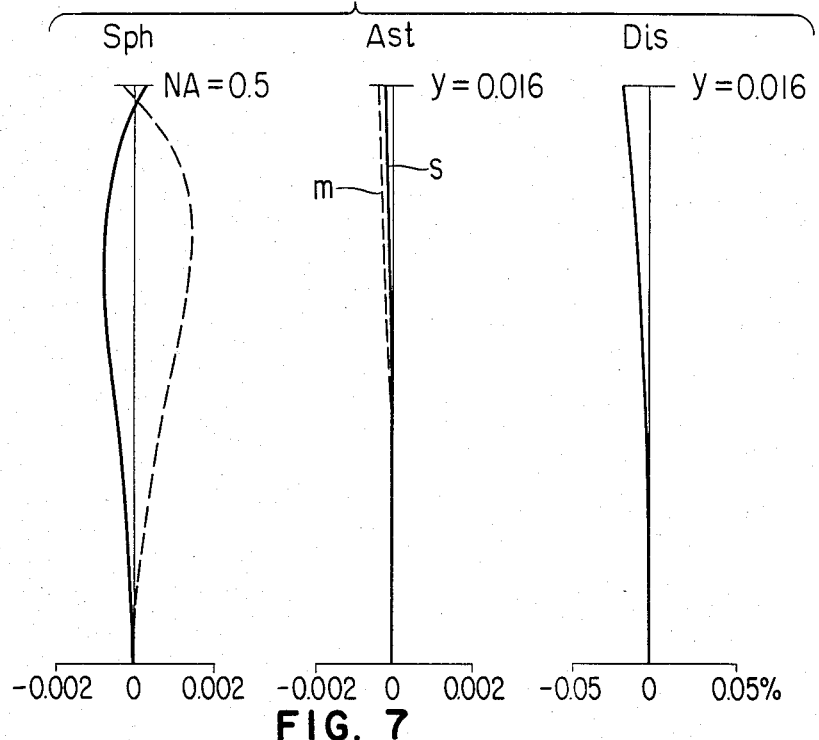
Figure 7:
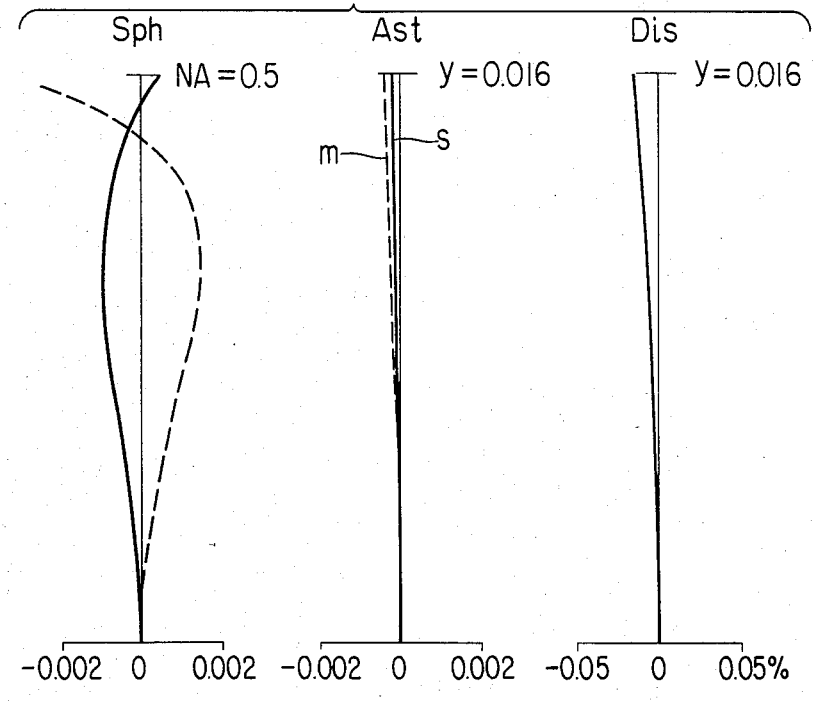
Figure 8:
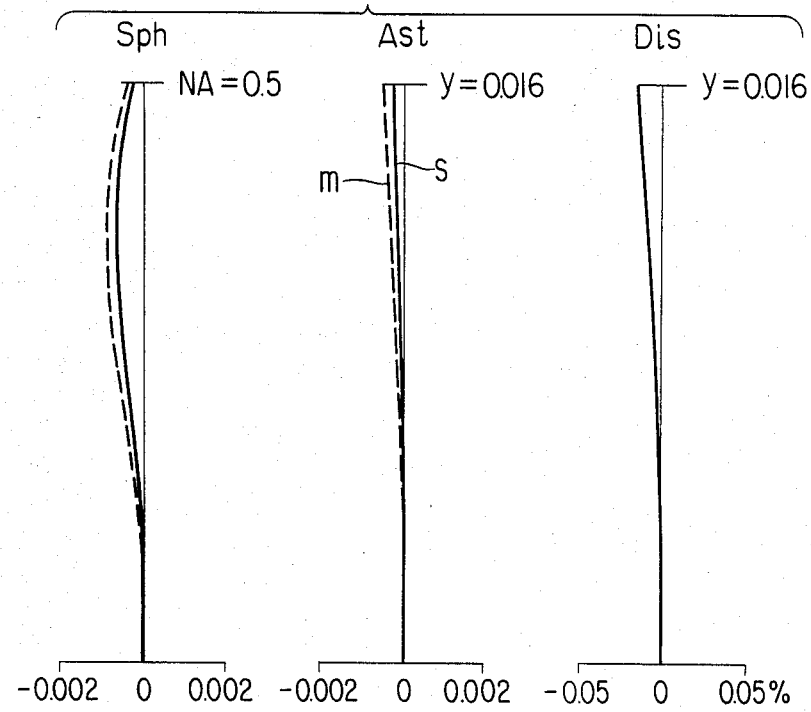
Figure 9:
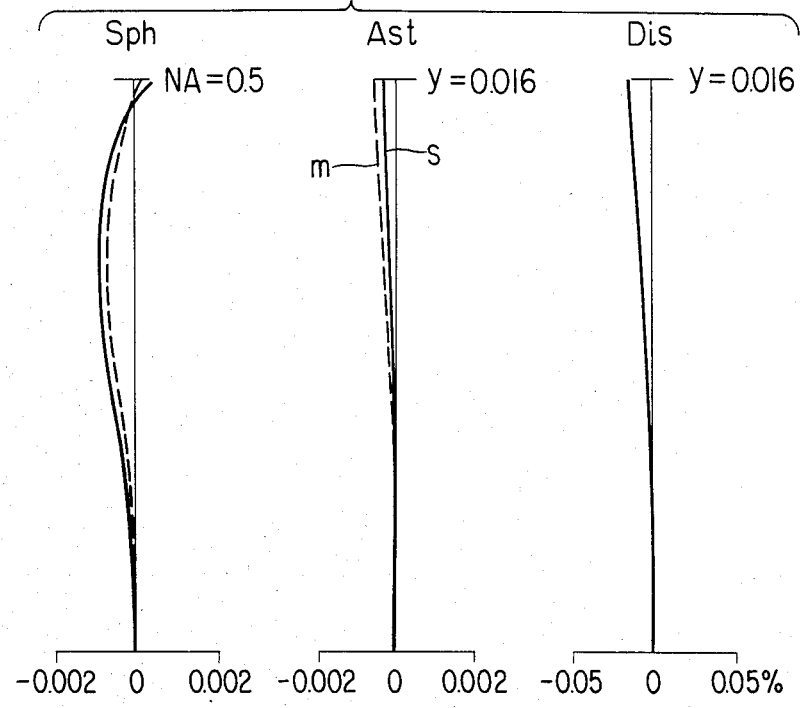
Figure 10:
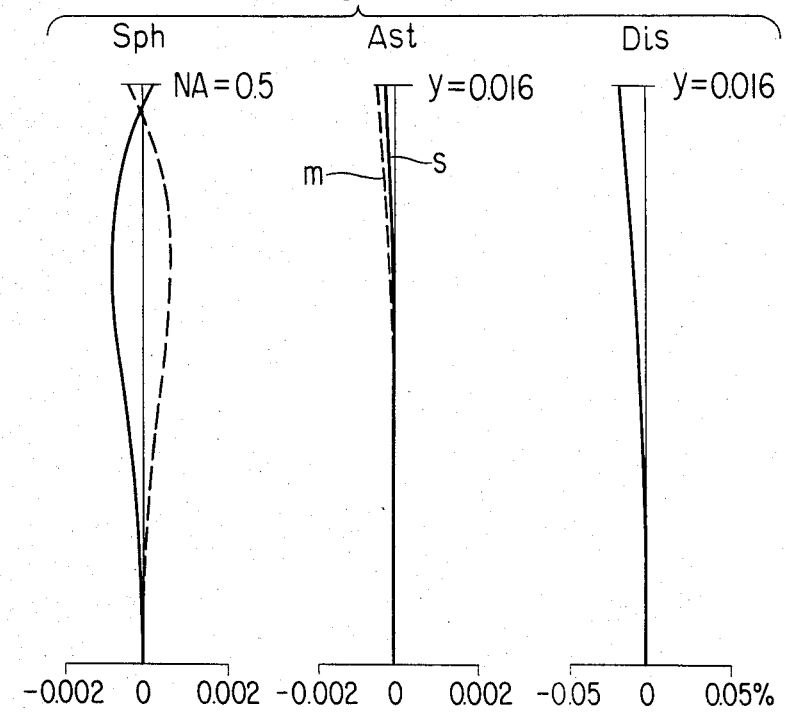
Figure 11:
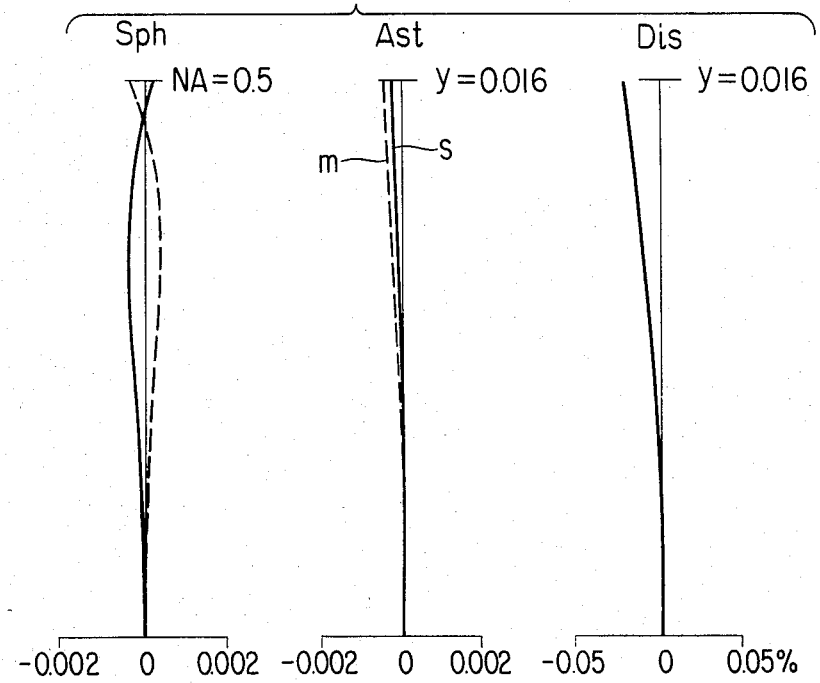
Figure 12:
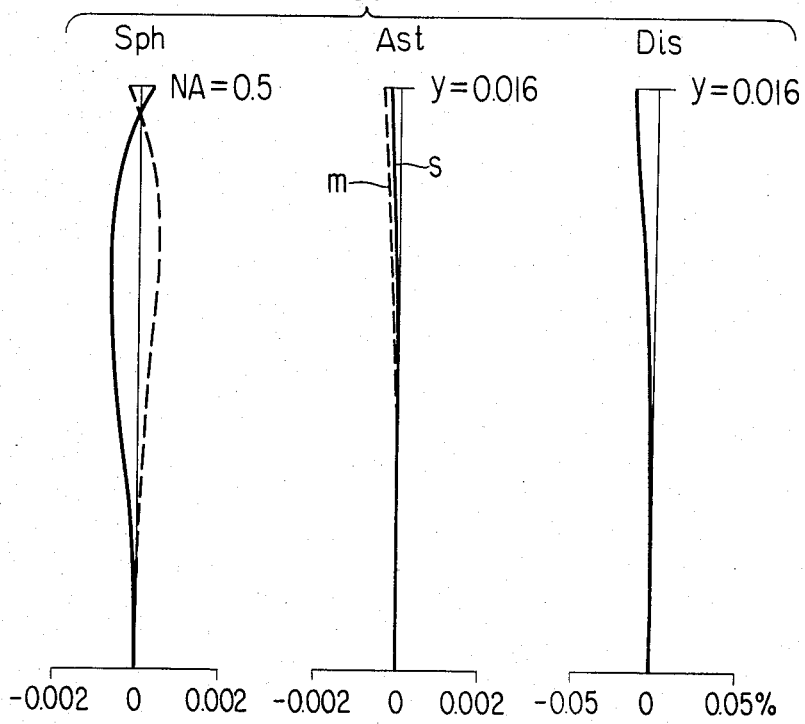
Figure 13:
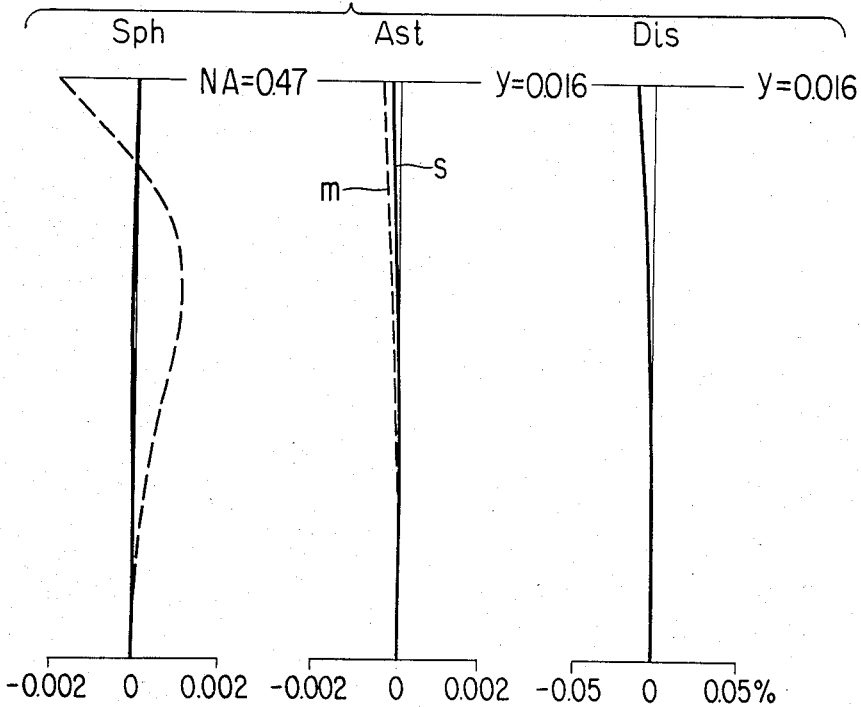

Some embodiments of the present invention will now be shown. In any of first to ninth embodiments, the numerical aperture N.A.=0.5 and in a tenth embodiment, N.A.=0.47. The numerical data of these embodiments will be shown below. The order of the first to ninth embodiments follows the order in which the negative refractive power of the second lens becomes weaker and the positive refractive power thereof becomes stronger. The bending of the second lens becomes sharper in this order. In both of the first lens and the third lens, the curvature of the lens surface distant from the object surface is sharper than the curvature of the lens surface near the object surface, and these lenses may in some cases be biconvex lenses and may in some cases be meniscus-shaped lenses having their concave surface facing the object side. To show the shapes of such lenses, FIG. 1 show the lens construction of the first embodiment, and FIGS. 2 and 3 show the lens constructions of the fourth and seventh embodiments, respectively. In these Figures, the object surface O, a parallel flat member P which serves as a cover glass for protecting the object surface, and the marginal ray from the on-axis object point are shown.

In the tables below, r represents the radius of curvature of each lens surface, d represents the center thickness and air space of each lens, n represents the refractive index for a light ray of wavelength $\lambda = 780$ nm, $\nu$ represents the Abbe number for the d-line ($\lambda = 587.6$ nm), and the subscript numbers represent the order from the side distant from the object surface. In each embodiment, a parallel flat member P which serves as a cover glass for protecting the object surface is provided on the object surface and the refractive index thereof is $n = 1.4855$ in the first to ninth embodiments and $n = 1.55$ in the tenth embodiment. In each table, the thickness of the cover glass is shown as t and the working distance w is shown as the distance from the surface of the third lens adjacent to the object side to the parallel flat member.

Embodiment 1
f = 1.0   N.A. = 0.5
$r_1 = 1.3725$   $d_1 = 0.2299$   $n_1 = 1.7928$   $\nu_1 = 39.59$
$r_2 = -12.0102$   $d_2 = 0.2069$   $n_2 = 1.0$
$r_3 = -1.3734$   $d_3 = 0.1494$   $n_3 = 1.7928$   $\nu_2 = 39.59$
$r_4 = -5.1382$   $d_4 = 0.02$   $n_4 = 1.0$
$r_5 = 0.8975$   $d_5 = 0.262$   $n_5 = 1.7928$   $\nu_3 = 39.59$
$r_6 = -29.8$ $\begin{cases} t = 0.253 \\ w = 0.459 \end{cases}$ $\begin{cases} r_4/f = -5.1382 \\ f/f_2 = -0.4155 \\ d_4/f = 0.02 \\ f_3/f = 1.1032 \\ r_5/f = 0.8975 \\ d_2/d_3 = 1.385 \\ \Sigma d = 0.8682 \end{cases}$ Embodiment 2
f = 1.0   N.A. = 0.5
$r_1 = 1.6091$   $d_1 = 0.1954$   $n_1 = 1.7836$   $\nu_1 = 40.98$
$r_2 = -16.0948$   $d_2 = 0.2183$   $n_2 = 1.0$
$r_3 = -1.2654$   $d_3 = 0.1264$   $n_3 = 1.7836$   $\nu_2 = 40.98$
$r_4 = -2.3886$   $d_4 = 0.046$   $n_4 = 1.0$
$r_5 = 0.9011$   $d_5 = 0.2873$   $n_5 = 1.7836$   $\nu_3 = 40.98$
$r_6 = \infty$ $\begin{cases} t = 0.253 \\ w = 0.484 \end{cases}$ $\begin{cases} r_4/f = -2.3886 \\ f/f_2 = -0.2768 \\ d_4/f = 0.046 \\ f_3/f = 1.1501 \\ r_5/f = 0.9011 \\ d_2/d_3 = 1.727 \\ \Sigma d = 0.873 \end{cases}$ Embodiment 3
f = 1.0   N.A. = 0.5
$r_1 = 1.4302$   $d_1 = 0.2299$   $n_1 = 1.7928$   $\nu_1 = 39.59$
$r_2 = 24.4565$   $d_2 = 0.2069$   $n_2 = 1.0$
$r_3 = -1.4711$   $d_3 = 0.1494$   $n_3 = 1.7928$   $\nu_2 = 39.59$
$r_4 = -2.6957$   $d_4 = 0.02$   $n_4 = 1.0$
$r_5 = 0.8332$   $d_5 = 0.262$   $n_5 = 1.7928$   $\nu_3 = 39.59$
$r_6 = 5.7482$ $\begin{cases} t = 0.2530 \\ w = 0.478 \end{cases}$ $\begin{cases} r_4/f = -2.6957 \\ f/f_2 = -0.2316 \\ d_4/f = 0.02 \\ f_3/f = 1.2008 \\ r_5/f = 0.8332 \\ d_2/d_3 = 1.385 \\ \Sigma d = 0.8682 \end{cases}$ Embodiment 4
f = 1.0   N.A. = 0.5
$r_1 = 1.7094$   $d_1 = 0.2306$   $n_1 = 1.7928$   $\nu_1 = 39.59$
$r_2 = \infty$   $d_2 = 0.1537$   $n_2 = 1.0$
$r_3 = -1.1305$   $d_3 = 0.1537$   $n_3 = 1.7298$   $\nu_2 = 39.59$
$r_4 = -1.6397$   $d_4 = 0.0205$   $n_4 = 1.0$
$r_5 = 0.9651$   $d_5 = 0.2562$   $n_5 = 1.7928$   $\nu_3 = 39.59$
$r_6 = \infty$ $\begin{cases} t = 0.3074 \\ w = 0.526 \end{cases}$ $\begin{cases} r_4/f = -1.6397 \\ f/f_2 = -0.1887 \\ d_4/f = 0.0205 \\ f_3/f = 1.2174 \\ r_5/f = 0.9651 \\ d_2/d_3 = 1.0 \\ \Sigma d = 0.8147 \end{cases}$ Embodiment 5
f = 1.0   N.A. = 0.5
$r_1 = 1.3301$   $d_1 = 0.1840$   $n_1 = 1.7928$   $\nu_1 = 39.59$
$r_2 = 53.6674$   $d_2 = 0.1840$   $n_2 = 1.0$
$r_3 = -4.4987$   $d_3 = 0.1610$   $n_3 = 1.7928$   $\nu_2 = 39.59$
$r_4 = -20.5276$   $d_4 = 0.02$   $n_4 = 1.0$
$r_5 = 0.5820$   $d_5 = 0.1840$   $n_5 = 1.7298$   $\nu_3 = 39.59$
$r_6 = 0.9308$ $\begin{cases} t = 0.2530 \\ w = 0.456 \end{cases}$ $\begin{cases} r_4/f = -20.5276 \\ f/f_2 = -0.1370 \\ d_4/f = 0.02 \\ f_3/f = 1.5887 \\ r_5/f = 0.5820 \\ d_2/d_3 = 1.143 \\ \Sigma d = 0.7329 \end{cases}$ Embodiment 6
f = 1.0   N.A. = 0.5
$r_1 = 1.1499$   $d_1 = 0.1840$   $n_1 = 1.7928$   $\nu_1 = 39.59$
$r_2 = 6.5940$   $d_2 = 0.1993$   $n_2 = 1.0$
$r_3 = -2.5533$   $d_3 = 0.1610$   $n_3 = 1.7928$   $\nu_2 = 39.59$
$r_4 = -3.4540$   $d_4 = 0.02$   $n_4 = 1.0$
$r_5 = 0.6305$   $d_5 = 0.1840$   $n_5 = 1.7298$   $\nu_3 = 39.59$
$r_6 = 1.0313$ $\begin{cases} t = 0.2530 \\ w = 0.453 \end{cases}$ $\begin{cases} r_4/f = -3.4540 \\ f/f_2 = -0.0746 \\ d_4/f = 0.02 \\ f_3/f = 1.7015 \\ r_5 f = 0.6305 \\ d_2/d_3 = 1.238 \end{cases}$ -continued $\Sigma d = 0.7482$ Embodiment 7

$f = 1.0$      N.A. = 0.5

| | | |
|---|---|---|
| $r_1 = 1.7563$ | $d_1 = 0.1840$ | $n_1 = 1.7928$   $\nu_1 = 39.59$ |
| $r_2 = 27.0796$ | $d_2 = 0.1840$ | $n_2 = 1.0$ |
| $r_3 = -0.9$ | $d_3 = 0.1610$ | $n_3 = 1.7928$   $\nu_2 = 39.59$ |
| $r_4 = -0.9775$ | $d_4 = 0.02$ | $n_4 = 1.0$ |
| $r_5 = 0.7455$ | $d_5 = 0.1840$ | $n_5 = 1.7928$   $\nu_3 = 39.59$ |
| $r_6 = 1.7555$ | | |

$\begin{cases} t = 0.2530 \\ w = 0.591 \end{cases}$    $\begin{cases} r_4/f = -0.9775 \\ f/f_2 = -0.0057 \\ d_4/f = 0.02 \\ f_3/f = 1.5127 \\ r_5/f = 0.7455 \\ d_2/d_3 = 1.143 \\ \Sigma d = 0.7329 \end{cases}$ Embodiment 8

$f = 1.0$      N.A. = 0.5

| | | |
|---|---|---|
| $r_1 = 1.6485$ | $d_1 = 0.2$ | $n_1 = 1.7928$   $\nu_1 = 39.59$ |
| $r_2 = 18.5734$ | $d_2 = 0.2$ | $n_2 = 1.0$ |
| $r_3 = -0.9351$ | $d_3 = 0.161$ | $n_3 = 1.7928$   $\nu_2 = 39.59$ |
| $r_4 = -1.0024$ | $d_4 = 0.15$ | $n_4 = 1.0$ |
| $r_5 = 0.6729$ | $d_5 = 0.25$ | $n_5 = 1.7928$   $\nu_3 = 39.59$ |
| $r_6 = 1.311$ | | |

$\begin{cases} t = 0.253 \\ w = 0.459 \end{cases}$    $\begin{cases} r_4/f = -1.0024 \\ f/f_2 = 0.0033 \\ d_4/f = 0.15 \\ f_3/f = 1.4863 \\ r_5/f = 0.6729 \\ d_2/d_3 = 1.242 \\ \Sigma d = 0.961 \end{cases}$ Embodiment 9

$f = 1.0$      N.A. = 0.5

| | | |
|---|---|---|
| $r_1 = 1.2$ | $d_1 = 0.184$ | $n_1 = 1.7928$   $\nu_1 = 39.59$ |
| $r_2 = 9.3588$ | $d_2 = 0.2$ | $n_2 = 1.0$ |
| $r_3 = -0.9234$ | $d_3 = 0.161$ | $n_3 = 1.7928$   $\nu_2 = 39.59$ |
| $r_4 = -0.9808$ | $d_4 = 0.02$ | $n_4 = 1.0$ |
| $r_5 = 0.715$ | $d_5 = 0.184$ | $n_5 = 1.7928$   $\nu_3 = 39.59$ |
| $r_6 = 1.1653$ | | |

$\begin{cases} t = 0.253 \\ w = 0.496 \end{cases}$    $\begin{cases} r_4/f = -0.9808 \\ f/f_2 = -0.012 \\ d_4/f = 0.02 \\ f_3/f = 1.9767 \\ r_5/f = 0.715 \\ d_2 d_3 = 1.242 \\ \Sigma d = 0.749 \end{cases}$ Embodiment 10

$f = 1.0$      N.A. = 0.47

| | | |
|---|---|---|
| $r_1 = 2.4311$ | $d_1 = 0.184$ | $n_1 = 1.78356$   $\nu_1 = 40.92$ |
| $r_2 = -6.3213$ | $d_2 = 0.057$ | $n_2 = 1.0$ |
| $r_3 = -1.5353$ | $d_3 = 0.126$ | $n_3 = 1.78356$   $\nu_2 = 40.92$ |
| $r_4 = -2.2500$ | $d_4 = 0.023$ | $n_4 = 1.0$ |
| $r_5 = 0.7724$ | $d_5 = 0.230$ | $n_5 = 1.78356$   $\nu_3 = 40.92$ |
| $r_6 = 2.5225$ | | |

$\begin{cases} t = 0.276 \\ w = 0.600 \end{cases}$    $\begin{cases} r_4/f = -2.25 \\ f/f_2 = -0.15 \\ d_4/f = 0.023 \\ f_3/f = 1.34 \\ r_5/f = 0.772 \\ d_2/d_3 = 0.455 \\ \Sigma d = 0.62f \end{cases}$ The various aberrations in the first to tenth embodiments are shown in FIGS. 4 to 13, respectively. In each graph of spherical aberration, the offense against the sine condition is also indicated by a broken line.

It is apparent from these aberration graphs that each of the embodiments has a considerably long working distance and has an excellent imaging performance in spite of its being compact. In these embodiments, the parallel flat member P for protecting the object surface is provided and aberrations are corrected in this state. Accordingly, if the thickness of this member is varied, the aberrations will naturally fluctuate and of course, it will be necessary to somewhat modify the lens shape, but even in such case, according to the present invention, a likewise excellent imaging performance can be provided.

According to the present invention, as described above, there is provided a compact, high resolving power objective lens having a sufficiently long operating distance and yet having an excellent imaging performance.

We claim:

1. A compact objective lens having a long working distance, comprising a positive first lens disposed at a position most distant from an object surface, a meniscus-shaped second lens disposed on the object side of said first lens and having its convex surface facing the object side, and a positive third lens disposed on the object side of said second lens, said objective lens satisfying the following conditions:

$0.9 < |r_4|/f < 25$ $-0.45 < f/f_2 < 0.02$ $d_4/f < 0.18$ $0.50f < \Sigma d < 1.0f$ where f is the total focal length of the entire system, $r_4$ is the radius of curvature of the surface of said second lens which is adjacent to the object side, $f_2$ is the focal length of said second lens, $d_4$ is the spacing between said second lens and said third lens, and $\Sigma d$ is the full length from said first lens to said third lens.

2. An objective lens according to claim 1, further satisfying the following conditions:

$1.0 < f_3/f < 2.1$ $0.5 < r_5/f < 1.0$ where $f_3$ is the focal length of said third lens and $r_5$ is the radius of curvature of the surface of said third lens which is adjacent to said second lens.

3. An objective lens according to claim 2, further satisfying the following condition regarding the on-axis spacing $d_2$ between said first lens and said second lens and the center thickness $d_3$ of said second lens:

$0.4 < d_2/d_3 < 2.0$.

4. An objective lens according to claim 2, wherein numerical data are as follows:

$f = 1.0$      N.A. = 0.5

| | | |
|---|---|---|
| $r_1 = 1.3725$ | $d_1 = 0.2299$ | $n_1 = 1.7928$   $\nu_1 = 39.59$ |
| $r_2 = -12.0102$ | $d_2 = 0.2069$ | $n_2 = 1.0$ |
| $r_3 = -1.3734$ | $d_3 = 0.1494$ | $n_3 = 1.7928$   $\nu_2 = 39.59$ |
| $r_4 = -5.1382$ | $d_4 = 0.02$ | $n_4 = 1.0$ |
| $r_5 = 0.8975$ | $d_5 = 0.262$ | $n_5 = 1.7928$   $\nu_3 = 39.59$ |
| $r_6 = -29.8$ | | |

$\begin{cases} t = 0.253 \\ w = 0.459 \end{cases}$    $\begin{cases} r_4/f = -5.1382 \\ f/f_2 = -0.4155 \\ d_4/f = 0.02 \\ f_3/f = 1.1032 \\ r_5/f = 0.8975 \\ d_2 d_3 = 1.385 \\ \Sigma d = 0.8682 \end{cases}$ where r represents the radius of curvature of each lens surface, d represents the center thickness and air space of each lens, n represents the refractive index for light ray of wavelength $\lambda = 780$ nm, $\nu$ represents the Abbe number for d-line ($\lambda = 587.6$ nm), and the subscript numbers represent the order from the side distant from the object surface.

5. An objective lens according to claim 2, wherein numerical data are as follows:

| f = 1.0 | | N.A. = 0.5 | |
|---|---|---|---|
| $r_1 = 1.6091$ | $d_1 = 0.1954$ | $n_1 = 1.7836$ | $\nu_1 = 40.98$ |
| $r_2 = -16.0948$ | $d_2 = 0.2183$ | $n_2 = 1.0$ | |
| $r_3 = -1.2654$ | $d_3 = 0.1264$ | $n_3 = 1.7836$ | $\nu_2 = 40.98$ |
| $r_4 = -2.3886$ | $d_4 = 0.046$ | $n_4 = 1.0$ | |
| $r_5 = 0.9011$ | $d_5 = 0.2873$ | $n_5 = 1.7836$ | $\nu_3 = 40.98$ |
| $r_6 = \infty$ | | | |

$$\begin{cases} t = 0.253 \\ w = 0.484 \end{cases} \begin{cases} r_4/f = -2.3886 \\ f/f_2 = -0.2768 \\ d_4/f = 0.046 \\ f_3/f = 1.1501 \\ r_5/f = 0.9011 \\ d_2/d_3 = 1.727 \\ \Sigma d = 0.873 \end{cases}$$

where r represents the radius of curvature of each lens surface, d represents the center thickness and air space of each lens, n represents the refractive index for light ray of wavelength λ=780 nm, ν represents the Abbe number for d-line (λ=587.6 nm), and the subscript numbers represent the order from the side distant from the object surface.

6. An objective lens according to claim 2, wherein numerical data are as follows:

| f = 1.0 | | N.A. = 0.5 | |
|---|---|---|---|
| $r_1 = 1.4302$ | $d_1 = 0.2299$ | $n_1 = 1.7928$ | $\nu_1 = 39.59$ |
| $r_2 = 24.4565$ | $d_2 = 0.2069$ | $n_2 = 1.0$ | |
| $r_3 = -1.4711$ | $d_3 = 0.1494$ | $n_3 = 1.7928$ | $\nu_2 = 39.59$ |
| $r_4 = -2.6957$ | $d_4 = 0.02$ | $n_4 = 1.0$ | |
| $r_5 = 0.8332$ | $d_5 = 0.262$ | $n_5 = 1.7928$ | $\nu_3 = 39.59$ |
| $r_6 = 5.7482$ | | | |

$$\begin{cases} t = 0.2530 \\ w = 0.478 \end{cases} \begin{cases} r_4/f = -2.6957 \\ f/f_2 = -0.2316 \\ d_4/f = 0.02 \\ f_3/f = 1.2008 \\ r_5/f = 0.8332 \\ d_2/d_3 = 1.385 \\ \Sigma d = 0.8682 \end{cases}$$

where r represents the radius of curvature of each lens surface, d represents the center thickness and air space of each lens, n represents the refractive index for light ray of wavelength λ=780 nm, ν represents the Abbe number for d-line (λ=587.6 nm), and the subscript numbers represent the order from the side distant from the object surface.

7. An objective lens according to claim 2, wherein numerical data are as follows:

| f = 1.0 | | N.A. = 0.5 | |
|---|---|---|---|
| $r_1 = 1.7094$ | $d_1 = 0.2306$ | $n_1 = 1.7928$ | $\nu_1 = 39.59$ |
| $r_2 = \infty$ | $d_2 = 0.1537$ | $n_2 = 1.0$ | |
| $r_3 = -1.1305$ | $d_3 = 0.1537$ | $n_3 = 1.7928$ | $\nu_2 = 39.59$ |
| $r_4 = -1.6397$ | $d_4 = 0.0205$ | $n_4 = 1.0$ | |
| $r_5 = 0.9651$ | $d_5 = 0.2562$ | $n_5 = 1.7928$ | $\nu_3 = 39.59$ |
| $r_6 = \infty$ | | | |

$$\begin{cases} t = 0.3074 \\ w = 0.526 \end{cases} \begin{cases} r_4/f = -1.6397 \\ f/f_2 = -0.1887 \\ d_4/f = 0.0205 \\ f_3/f = 1.2174 \\ r_5/f = 0.9651 \\ d_2/d_3 = 1.0 \\ \Sigma d = 0.8147 \end{cases}$$

where r represents the radius of curvature of each lens surface, d represents the center thickness and air space of each lens, n represents the refractive index for light ray of wavelength λ=780 nm, ν represents the Abbe number for d-line (λ=587.6 nm), and the subscript numbers represent the order from the side distant from the object surface.

8. An objective lens according to claim 2, wherein numerical data are as follows:

| f = 1.0 | | N.A. = 0.5 | |
|---|---|---|---|
| $r_1 = 1.3301$ | $d_1 = 0.1840$ | $n_1 = 1.7928$ | $\nu_1 = 39.59$ |
| $r_2 = 53.6674$ | $d_2 = 0.1840$ | $n_2 = 1.0$ | |
| $r_3 = -4.4987$ | $d_3 = 0.1610$ | $n_3 = 1.7928$ | $\nu_2 = 39.59$ |
| $r_4 = -20.5276$ | $d_4 = 0.02$ | $n_4 = 1.0$ | |
| $r_5 = 0.5820$ | $d_5 = 0.1840$ | $n_5 = 1.7928$ | $\nu_3 = 39.59$ |
| $r_6 = 0.9308$ | | | |

$$\begin{cases} t = 0.2530 \\ w = 0.456 \end{cases} \begin{cases} r_4/f = -20.5276 \\ f/f_2 = -0.1370 \\ d_4/f = 0.02 \\ f_3/f = 1.5887 \\ r_5/f = 0.5820 \\ d_2/d_3 = 1.143 \\ \Sigma d = 0.7329 \end{cases}$$

where r represents the radius of curvature of each lens surface, d represents the center thickness and air space of each lens, n represents the refractive index for light ray of wavelength λ=780 nm, ν represents the Abbe number for d-line (λ=587.6 nm), and the subscript numbers represent the order from the side distant from the object surface.

9. An objective lens according to claim 2, wherein numerical data are as follows:

| f = 1.0 | | N.A. = 0.5 | |
|---|---|---|---|
| $r_1 = 1.1499$ | $d_1 = 0.1840$ | $n_1 = 1.7928$ | $\nu_1 = 39.59$ |
| $r_2 = 6.5940$ | $d_2 = 0.1993$ | $n_2 = 1.0$ | |
| $r_3 = -2.5533$ | $d_3 = 0.1610$ | $n_3 = 1.7928$ | $\nu_2 = 39.59$ |
| $r_4 = -3.4540$ | $d_4 = 0.02$ | $n_4 = 1.0$ | |
| $r_5 = 0.6305$ | $d_5 = 0.1840$ | $n_5 = 1.7928$ | $\nu_3 = 39.59$ |
| $r_6 = 1.0313$ | | | |

$$\begin{cases} t = 0.2530 \\ w = 0.453 \end{cases} \begin{cases} r_4/f = -3.4540 \\ f/f_2 = -0.0746 \\ d_4/f = 0.02 \\ f_3/f = 1.7015 \\ r_5/f = 0.6305 \\ d_2/d_3 = 1.238 \\ \Sigma d = 0.7482 \end{cases}$$

where r represents the radius of curvature of each lens surface, d represents the center thickness and air space of each lens, n represents the refractive index for light ray of wavelength λ=780 nm, ν represents the Abbe number for d-line (λ=587.6 nm), and the subscript numbers represent the order from the side distant from the object surface.

10. An objective lens according to claim 2, wherein numerical data are as follows:

| f = 1.0 | | N.A. = 0.5 | |
|---|---|---|---|
| $r_1 = 1.7563$ | $d_1 = 0.1840$ | $n_1 = 1.7928$ | $\nu_1 = 39.59$ |
| $r_2 = 27.0796$ | $d_2 = 0.1840$ | $n_2 = 1.0$ | |
| $r_3 = -0.9$ | $d_3 = 0.1610$ | $n_3 = 1.7928$ | $\nu_2 = 39.59$ |
| $r_4 = -0.9775$ | $d_4 = 0.02$ | $n_4 = 1.0$ | |
| $r_5 = 0.7455$ | $d_5 = 0.1840$ | $n_5 = 1.7928$ | $\nu_3 = 39.59$ |
| $r_6 = 1.7555$ | | | |

$$\begin{cases} t = 0.2530 \\ w = 0.591 \end{cases} \begin{cases} r_4/f = -0.9775 \\ f/f_2 = -0.0057 \\ d_4/f = 0.02 \\ f_3/f = 1.5127 \\ r_2/f = 0.7455 \\ d_2/d_3 = 1.143 \\ \Sigma d = 0.7329 \end{cases}$$

where r represents the radius of curvature of each lens surface, d represents the center thickness and air space of each lens, n represents the refractive index for light ray of wavelength $\lambda=780$ nm, $\nu$ represents the Abbe number for d-line ($\lambda=587.6$ nm), and the subscript numbers represent the order from the side distant from the object surface.

11. An objective lens according to claim 2, wherein numerical data are as follows:

| $f = 1.0$ | | $N.A. = 0.5$ | |
|---|---|---|---|
| $r_1 = 1.6485$ | $d_1 = 0.2$ | $n_1 = 1.7928$ | $\nu_1 = 39.59$ |
| $r_2 = 18.5734$ | $d_2 = 0.2$ | $n_2 = 1.0$ | |
| $r_3 = -0.9351$ | $d_3 = 0.161$ | $n_3 = 1.7928$ | $\nu_2 = 39.59$ |
| $r_4 = -1.0024$ | $d_4 = 0.15$ | $n_4 = 1.0$ | |
| $r_5 = 0.6729$ | $d_5 = 0.25$ | $n_5 = 1.7928$ | $\nu_3 = 39.59$ |
| $r_6 = 1.311$ | | | |

$\begin{cases} t = 0.253 \\ w = 0.459 \end{cases}$  $\begin{cases} r_4/f = -1.0024 \\ f/f_2 = 0.0033 \\ d_4/f = 0.15 \\ f_3/f = 1.4863 \\ r_5/f = 0.6729 \\ d_2/d_3 = 1.242 \\ \Sigma d = 0.961 \end{cases}$ where r represents the radius of curvature of each lens surface, d represents the center thickness and air space of each lens, n represents the refractive index for light ray of wavelength $\lambda=780$ nm, $\nu$ represents the Abbe number for d-line ($\lambda=587.6$ nm), and the subscript numbers represent the order from the side distant from the object surface.

12. An objective lens according to claim 2, wherein numerical data are as follows:

| $f = 1.0$ | | $N.A. = 0.5$ | |
|---|---|---|---|
| $r_1 = 1.2$ | $d_1 = 0.184$ | $n_1 = 1.7928$ | $\nu_1 = 39.59$ |
| $r_2 = 9.3588$ | $d_2 = 0.2$ | $n_2 = 1.0$ | |
| $r_3 = -0.9234$ | $d_3 = 0.161$ | $n_3 = 1.7928$ | $\nu_2 = 39.59$ |
| $r_4 = -0.9808$ | $d_4 = 0.02$ | $n_4 = 1.0$ | |
| $r_5 = 0.715$ | $d_5 = 0.184$ | $n_5 = 1.7928$ | $\nu_3 = 39.59$ |
| $r_6 = 1.1653$ | | | |

$\begin{cases} t = 0.253 \\ w = 0.496 \end{cases}$  $\begin{cases} r_4/f = -0.9808 \\ f/f_2 = -0.012 \\ d_4/f = 0.02 \\ f_3/f = 1.9767 \\ r_5/f = 0.715 \\ d_2/d_3 = 1.242 \\ \Sigma d = 0.749 \end{cases}$ where r represents the radius of curvature of each lens surface, d represents the center thickness and air space of each lens, n represents the refractive index for light ray of wavelength $\lambda=780$ nm, $\nu$ represents the Abbe number for d-line ($\lambda=587.6$ nm), and the subscript numbers represent the order from the side distant from the object surface.

13. An objective lens according to claim 2, wherein numerical data are as follows:

| $f = 1.0$ | | $N.A. = 0.47$ | |
|---|---|---|---|
| $r_1 = 2.4311$ | $d_1 = 0.184$ | $n_1 = 1.78356$ | $\nu_1 = 40.92$ |
| $r_2 = -6.3213$ | $d_2 = 0.057$ | $n_2 = 1.0$ | |
| $r_3 = -1.5353$ | $d_3 = 0.126$ | $n_3 = 1.78356$ | $\nu_2 = 40.92$ |
| $r_4 = -2.2500$ | $d_4 = 0.023$ | $n_4 = 1.0$ | |
| $r_5 = 0.7724$ | $d_5 = 0.230$ | $n_5 = 1.78356$ | $\nu_3 = 40.92$ |
| $r_6 = 2.5225$ | | | |

$\begin{cases} t = 0.276 \\ w = 0.600 \end{cases}$  $\begin{cases} r_4/f = -2.25 \\ f/f_2 = -0.15 \\ d_4/f = 0.023 \\ f_3/f = 1.34 \\ r_5/f = 0.772 \\ d_2/d_3 = 0.455 \\ \Sigma d = 0.62f \end{cases}$ where r represents the radius of curvature of each lens surface, d represents the center thickness and air space of each lens, n represents the refractive index for light ray of wavelength $\lambda=780$ nm, $\nu$ represents the Abbe number for d-line ($\lambda=587.6$ nm), and the subscript numbers represent the order from the side distant from the object surface.

* * * * *